(12) United States Patent
Kim et al.

(10) Patent No.: US 12,435,789 B1
(45) Date of Patent: Oct. 7, 2025

(54) DEVICE FOR MANUALLY RELEASING PARKING STATE

(71) Applicant: KYUNG CHANG INDUSTRIAL CO., LTD., Daegu (KR)

(72) Inventors: Young Geun Kim, Daegu (KR); Kyu Jung Kim, Daegu (KR)

(73) Assignee: KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 18/927,775

(22) Filed: Oct. 25, 2024

(51) Int. Cl.
*F16H 63/34* (2006.01)

(52) U.S. Cl.
CPC ................. *F16H 63/3491* (2013.01)

(58) Field of Classification Search
CPC .................................................. F16H 63/3491
See application file for complete search history.

(56) References Cited

U.S. PATENT DOCUMENTS

| | | | | |
|---|---|---|---|---|
| 5,954,179 | A * | 9/1999 | Osborn | F16H 63/3416 192/219.5 |
| 2002/0162709 | A1 * | 11/2002 | Drennen | F16D 65/18 188/72.1 |
| 2015/0298663 | A1 * | 10/2015 | Tashiro | B60T 7/047 188/2 D |
| 2017/0138475 | A1 * | 5/2017 | Kim | F16H 63/3491 |
| 2018/0238448 | A1 * | 8/2018 | Gausrab | F16H 19/001 |
| 2020/0032903 | A1 * | 1/2020 | Legault | F16C 1/18 |
| 2020/0122701 | A1 * | 4/2020 | Alu | B60T 7/101 |
| 2023/0160469 | A1 * | 5/2023 | Yoshida | F16H 63/3466 192/219.4 |
| 2024/0102554 | A1 * | 3/2024 | Tan | F16H 63/3466 |

* cited by examiner

*Primary Examiner* — Farhana Pervin
(74) *Attorney, Agent, or Firm* — BROADVIEW IP LAW, PC

(57) ABSTRACT

Disclosed is a manual parking state release device. The manual parking state release device according to one aspect of the present invention may include a first cable configured to release a parking state of a transmission, a first frame configured to apply an external force to the first cable while rotating in a first direction so that the parking state of the transmission is released, a second frame configured to rotate the first frame in the first direction while rotating in a second direction when a user's external force is applied, and a bullet configured to prevent the second frame from unintentionally rotating in the first direction so that a parking release state of the transmission is maintained.

13 Claims, 5 Drawing Sheets

DEVICE FOR MANUALLY RELEASING PARKING STATE

1. FIELD OF THE INVENTION

The present invention relates to a manual parking state release device, and more specifically, to a manual parking state release device which may manually release a parking state of an electric vehicle or an internal combustion engine vehicle.

2. DISCUSSION OF RELATED ART

Conventional devices for releasing a parking state of a vehicle in an emergency adopt a combination method of electronic and manual types or a manual release method, but have a structure that is fixed by a separate tool to continuously maintain a state in which the parking state has been released.

In particular, since electric vehicles have increased weight due to the application of batteries, conventional devices for releasing the parking state cannot release a parking state due to a high weight, or even when releasing the parking state, may not maintain the parking release state, resulting in an unexpected situation in which the vehicles return to the parking state.

In the electric vehicle, a high load occurs when the parking state is released, the parking state cannot be released by the conventional lever type handle (a gear ratio of a lever ranges from 3 to 4), and when using a separate tool, the use of a dedicated tool and a one-touch manipulation method are not possible, and thus there is hassle of having to repeatedly the same operation several to several tens of times, and as an excessive torque is applied due to unclearly recognizing the parking state or the released state due to a manipulation mistake, there are problems that a transmission gear is damaged, the convenience for the separate tool is lowered, and manufacturing is not easy.

Of course, the parking state may be released using an electronic actuator, but there are problems that the electronic actuator is expensive and has installation limitations in a system, and due to the use of the power of an emergency battery, the battery is discharged after several operations.

Therefore, there is a need for the development of a technology for solving the above problems.

SUMMARY OF THE INVENTION

The present invention is directed to providing a manual parking state release device capable of releasing a parking state in an emergency to shift a gear to another stage, thereby enabling an emergency action.

The objects of the present invention are not limited to the above-described objects, and other objects which are not mentioned will be clearly understood by those skilled in the art to which the present invention pertains from the following description.

According to one aspect of the present invention, there is provided a manual parking state release device, which includes a first cable configured to release a parking state of a transmission, a first frame configured to apply an external force to the first cable while rotating in a first direction so that the parking state of the transmission is released, a second frame configured to rotate the first frame in the first direction while rotating in a second direction when an external force of a user is applied, and a bullet configured to prevent the second frame from unintentionally rotating in the first direction so that a parking release state of the transmission is maintained.

The second frame may have a groove providing a movement path of the bullet, and the groove may have a parking release position to be fixedly caught by the bullet to prevent from the second frame unintentionally rotating in the first direction.

The groove may have a first unit area extending in a circumferential direction of the second frame, the bullet may relatively move from a front end to a rear end of the first unit area in a process of the second frame rotating in the second direction, and the rear end of the first unit area may be provided with a first temporary fixing position to be fixedly caught by the bullet to prevent the second frame from rotating in the second direction.

As the external force of the user is eliminated in a state in which the bullet relatively moves to the first temporary fixing position, the second frame may rotate in the first direction by an external force sequentially transmitted through the first cable and the first frame, and the groove may have a second unit area formed so that the bullet disposed at the first temporary fixing position relatively moves to the parking release position when the second frame rotates in the first direction.

The groove may have a first rotation wall that prevents the bullet disposed at the first temporary fixing position from moving to return to the first unit area when the second frame rotates in the first direction.

As the external force of the user is applied in a state in which the bullet relatively moves to the parking release position, the second frame may rotate in the second direction, the groove may have a third unit area formed so that the bullet disposed at the parking release position relatively moves while leaving the parking release position when the second frame rotates in the second direction, and a rear end of the third unit area may be provided with a second temporary fixing position to be fixedly caught by the bullet to prevent the second frame from rotating in the second direction.

The groove may have a second rotation wall that prevents the bullet disposed at the parking release position from moving to return to the second unit area when the second frame rotates in the second direction.

As the external force of the user is eliminated in a state in which the bullet relatively moves to the second temporary fixing position, the second frame may rotate in the first direction by an external force sequentially transmitted through the first cable and the first frame, and the groove may have a fourth unit area formed so that the bullet disposed at the second temporary fixing position relatively moves to an initial position when the second frame rotates in the first direction.

The fourth unit area may include a 4-1 unit area extending in the circumferential direction of the second frame, and a 4-2 unit area connecting a rear end of the 4-1 unit area to the first unit area.

The bullet may be disposed to move in a radial direction as much as a difference between a radial distance from a center of the second frame to the first temporary fixing position and a radial distance from the center of the second frame to the second temporary fixing position.

The device may further include a cover having a support surface that prevents the bullet from moving in a circumferential direction when the second frame rotates.

A first gear surface may be formed along a circumference of the first frame, and a second gear surface engaged with the first gear surface may be provided at a center of the second frame.

A distance from a center of the first frame to the first gear surface may be formed to be greater than a distance from the center of the second frame to the second gear surface is.

The first frame may have a first cable fixing groove to which an end portion of the first cable is fixed, and the second frame may have a second cable fixing groove to which an end portion of the second cable through which the user applies the external force is fixed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings so that those skilled in the art to which the present invention pertains may easily carry out the present invention. The present invention may be implemented in various different forms and is not limited to the embodiments described herein. In order to clearly describe the present invention, parts not related to the description have been omitted in the accompanying drawings, and identical or similar components are denoted by the same reference numerals throughout the specification.

Words and terms used in the specification and the claims should not be construed as being limited to their usual or dictionary meanings and should be construed as meaning and concept consistent with the technical spirit of the present invention according to a principle in which the inventors can define terms and a concept in order to describe their inventions in the best method.

Therefore, since embodiments described in the specification and configurations illustrated in drawings correspond to exemplary embodiments of the present invention and do not represent all of the technical spirit of the present invention, various equivalents and modifications of the corresponding configurations capable of replacing the embodiments and the configurations may be present at the time of the application of the present invention.

In the specification, it should be understood that the term "include" or "have" is intended to describe that a feature, a number, a step, an operation, a component, a part, or a combination thereof described in the specification is present, but does not preclude the possibility of the presence or addition of one or more other features, numbers, steps, operations, components, parts, or combinations thereof.

Figure 1:
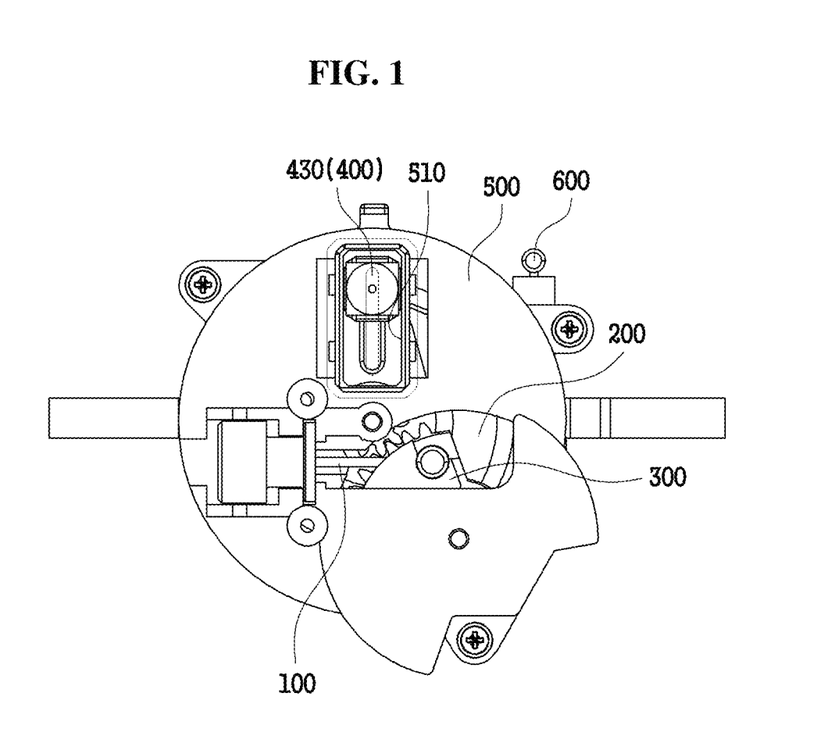
FIG. 1 is a perspective view of a manual parking state release device according to one embodiment of the present invention.
Figure 2:
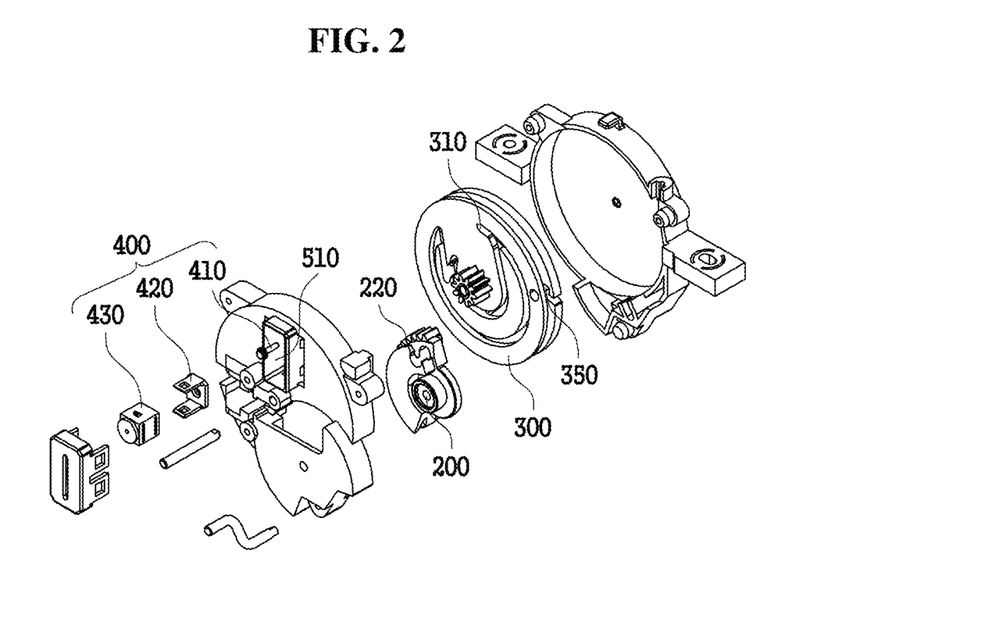
FIG. 2 is an exploded perspective view of the manual parking state release device according to one embodiment of the present invention.
Figure 3:
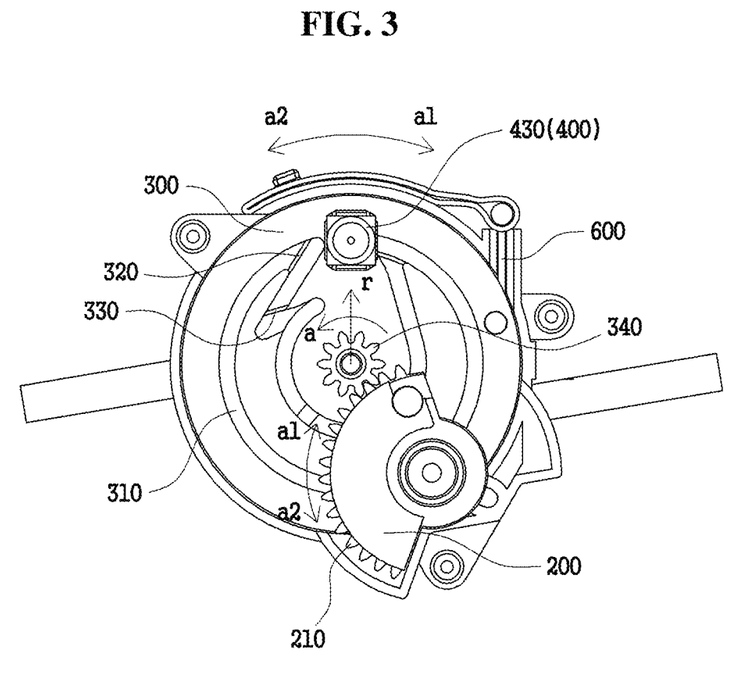
FIG. 3 is a front view showing a first frame, a second frame, and a bullet that are provided in the manual parking state release device according to one embodiment of the present invention and is a view showing an initial state (parking state)
Figure 4:
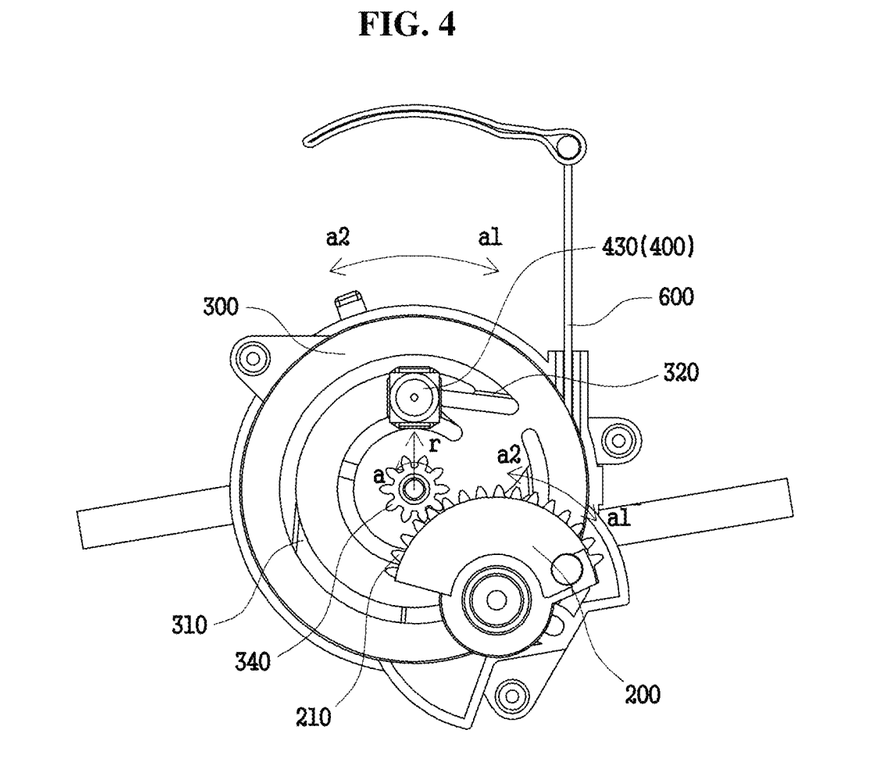
FIG. 4 is a front view showing the first frame, the second frame, and the bullet that are provided in the manual parking state release device according to one embodiment of the present invention and is a view showing the parking release state.
Figure 5:
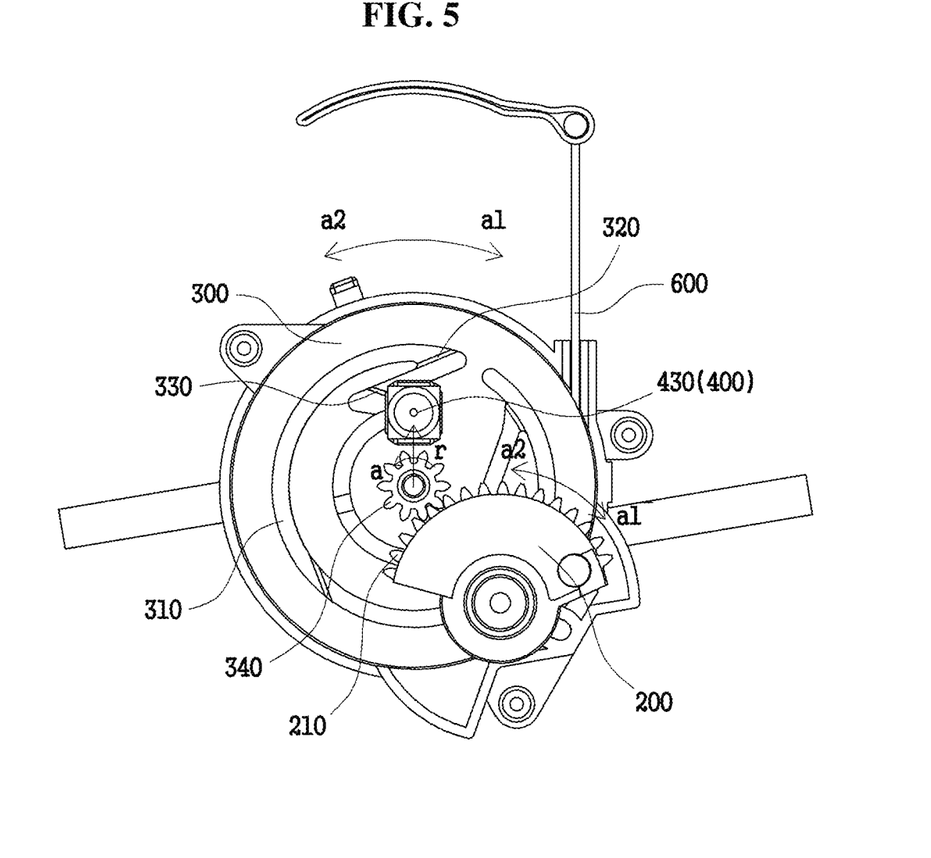
FIG. 5 is a front view showing the first frame, the second frame, and the bullet that are provided in the manual parking state release device according to one embodiment and is a view showing a state in which the bullet is disposed at a second temporary fixing position in the process of returning to the initial state (parking state) from the parking release state.

FIG. 1 is a perspective view of a manual parking state release device according to one embodiment of the present invention, FIG. 2 is an exploded perspective view of the manual parking state release device according to one embodiment of the present invention, FIG. 3 is a front view showing a first frame, a second frame, and a bullet that are provided in the manual parking state release device according to one embodiment of the present invention, and is a view showing an initial state (parking state), FIG. 4 is a front view showing the first frame, the second frame, and the bullet that are provided in the manual parking state release device according to one embodiment of the present invention and is a view showing the parking release state, and FIG. 5 is a front view showing the first frame, the second frame, and the bullet that are provided in the manual parking state release device according to one embodiment and is a view showing a state in which the bullet is disposed at a second temporary fixing position in the process of returning to the initial state (parking state) from the parking release state. Here, a direction a is a circumferential direction, a direction a1 is a first direction (clockwise), a direction a2 is a second direction (counterclockwise), and a direction r is a radial direction. To clearly describe the present invention, parts not related to the description are omitted from the drawings.

As shown in FIGS. 1 and 2, the manual parking state release device according to one embodiment of the present invention includes a first cable 100 for releasing a parking state of a transmission, a first frame 200 for applying an external force to the first cable 100 while rotating in the first direction a1 so that the parking state of the transmission is released, a second frame 300 for rotating the first frame 200 in the first direction a1 while rotating in a second direction a2 when an external force is applied by a user, and a bullet 400 for preventing the second frame 300 from unintentionally rotating in the first direction a1 so that the parking state of the transmission is maintained.

Here, the parking state of the transmission is a parking state, a parking state, or a P-stage state of a transmission gear, and the parking release state of the transmission is a parking release state or an N-stage state of the transmission gear.

In this case, the first cable 100 is connected to a lever connected to a parking sprag of the transmission, and when a vehicle is parked, the transmission is in the parking state (the transmission gear is a P-stage), and when the first cable 100 is pulled in this state, the parking sprag of the transmission is released to become a state in which shifting to another stage is possible. In an emergency, it is necessary to manually release the parking state of the transmission to move a vehicle, and to this end, the first cable 100 should be pulled by applying a greater force than a driving force of an actuator applied to the first cable 100, and in order to stably maintain the parking release state, the pulled state of the first cable 100 should be stably maintained.

To this end, the first frame 200 applies an external force to the first cable 100 while rotating in the first direction a1 so that the parking state of the transmission is released, and the external force applied to the first cable 100 should be a greater than the driving force of the actuator applied to the first cable 100 to maintain the parking state. The second frame 300 rotates the first frame 200 in the first direction a1 while rotating in the second direction a2 when the user's external force is applied.

As shown in FIG. 2, the bullet 400 can prevent the second frame 300 from unintentionally rotating in the first direction a1, thereby stably maintaining the parking release state of the transmission. The bullet 400 may include a bullet pin 410 inserted into the second frame 300, a bullet fixing frame 420 for fixing the bullet pin 410, and a bullet support frame 430 for supporting the bullet pin 410 to move only in the radial direction r.

As shown in FIG. 3, the bullet 400 may be disposed at an initial position in the initial state (parking state). As shown in FIG. 4, when the user applies an external force to a second cable 600 to rotate the second frame 300 in the second direction a2, the first frame 200 coupled to the second frame 300 may gradually release the parking state of the transmission while rotating in the first direction a1. In such a process, as the second frame 300 rotates, the position of the bullet 400 is relatively changed, and the parking state of the transmission is fully released. When the bullet 400 is disposed at a parking release position PR, the rotation of the second frame 300 in the first direction a1 can be prevented by the bullet 400 even when the user's external force is eliminated, thereby stably maintaining the parking release state. Then, after the emergency situation ends, as shown in FIG. 5, when the user applies an external force to the second cable 600 to rotate the second frame 300 in the second direction a2, the bullet 400 is released from the parking release position PR. Then, when the user eliminates the external force, the second frame 300 rotates in the first direction a1 to relatively change the position of the bullet 400 to return to the initial position.

At this time, the user may pull the second cable 600 so that the second frame 300 rotates in the second direction a2, and a separate strap may be provided on the second cable 600 so that the user may easily apply an external force. The user may release the parking state in a method of pulling the second cable 600 (pull-pull method) or apply an external force to return to the parking state, thereby improving the user's convenience.

That is, since the first cable 100 for releasing the parking state of the transmission may be pulled through the second frame 300 for rotating the first frame 200 in the first direction a1 while rotating in the second direction a2 when the user's external force is applied, it is possible to manually release the parking state and when the parking state is released, prevent the second frame 300 from unintentionally rotating in the first direction a1 using the bullet 400, thereby stably maintaining the parking release state of the transmission.

Figure 6:
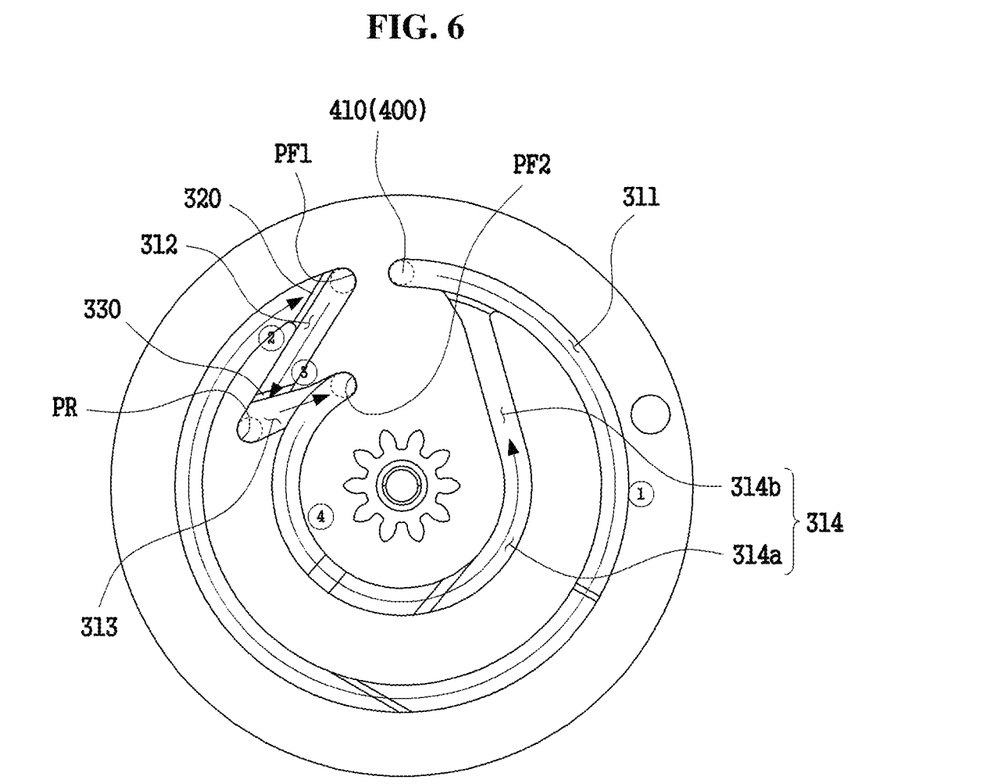
FIG. 6 is a front view specifically showing a groove of the second frame provided in the manual parking state release device according to one embodiment and is a view showing the arrangement of the bullet according to each state.

FIG. 6 is a front view specifically showing a groove of the second frame provided in the manual parking state release device according to one embodiment and is a view showing the arrangement of the bullet according to each state.

As shown in FIG. 6, the second frame 300 has a groove 310 for providing a movement path of the bullet 400, and the groove 310 may have the parking release position PR to be fixedly caught by the bullet 400 to prevent the second frame 300 from unintentionally rotating in the first direction a1.

That is, when the second frame 300 rotates in a state in which the bullet pin 410 of the bullet 400 has been inserted into the groove 310 of the second frame 300, the position of the bullet 400 is changed relatively. To this end, the bullet 400 is formed to change its position only in the radial direction r and does not move in the circumferential direction a.

That is, as the second frame 300 rotates in the second direction a2, the relative position of the bullet 400 in the groove 310 is continuously changed, and when the bullet 400 is disposed at the parking release position PR provided in the groove 310, even when the user eliminates the external force, the second frame 300 may be fixedly caught on the bullet 400 to be prevented from rotating in the first direction a1, thereby stably maintaining the parking release state.

As shown in FIG. 6, the groove 310 may have a first unit area 311 of the second frame 300, which extends in the circumferential direction a, the bullet 400 may move relatively from a front end to a rear end of the first unit area 311 in the process of the second frame 300 rotating in the second direction a2, and the rear end of the first unit area 311 may be provided with a first temporary fixing position PF1 to be fixedly caught by the bullet 400 to prevent the second frame 300 from rotating in the second direction a2.

That is, in the initial state, the bullet 400 is disposed at the front end of the first unit area 311, and when the user applies an external force to rotate the second frame 300 in the second direction a2, the bullet 400 moves (path (1)) along the first unit area 311. Then, when the bullet 400 is disposed at the first temporary fixing position PF1 provided at the rear end of the first unit area 311, the second frame 300 may no longer rotate in the second direction a2, and the user applies an external force to this state to manually release the parking state of the transmission.

As shown in FIG. 6, as the user's external force is eliminated in a state in which the bullet 400 relatively moves to the first temporary fixing position PF1, the second frame 300 may rotate in the first direction a1 by an external force sequentially transmitted through the first cable 100 and the first frame 200, and the groove 310 may have a second unit area 312 so that the bullet 400 disposed at the first temporary fixing position PF1 relatively moves to the parking release position PR when the second frame 300 rotates in the first direction a1.

That is, since the second frame 300 may no longer rotate in the second direction a2 when the bullet 400 is disposed at the first temporary fixing position PF1, the user no longer applies an external force after recognizing this state, and when the user's external force is eliminated, the second frame 300 may rotate in the first direction a1 by an external force sequentially transmitted through the first cable 100 and the first frame 200, and at this time, the bullet 400 may move (path (2)) to the parking release position PR along the second unit area 312, thereby stably maintaining the parking release state of the transmission.

In this case, the groove 310 may have a first rotation wall 320 for preventing the bullet 400 positioned at the first temporary fixing position PF1 from moving to return to the first unit area 311 when the second frame 300 rotates in the first direction a1, and, with the above configuration, the bullet 400 may stably move relatively to the parking release position PR along the second unit area 312.

As shown in FIG. 6, as the user's external force is applied in a state in which the bullet 400 relatively moves to the parking release position PR, the second frame 300 may rotate in the second direction a2, the groove 310 may have a third unit area 313 so that the bullet 400 disposed at the parking release position PR moves relatively while leaving from the parking release position PR when the second frame 300 rotates in the second direction a2, and a rear end of the third unit area 313 may be provided with a second temporary fixing position PF2 to be fixedly caught by the bullet 400 to prevent the second frame 300 from rotating in the second direction a2.

That is, it is necessary to form the parking release state of the transmission to end when the emergency situation ends. To this end, when the user applies an external force in a state in which the bullet 400 relatively moves to the parking release position PR, the second frame 300 may rotate in the second direction a2, and in this process, the bullet 400 moves (path (3)) while leaving the parking release position PR along the third unit area 313, when the bullet 400 is disposed at the second temporary fixing position PF2, the second frame 300 may no longer rotate in the second direction a2, and the user may apply an external force to this state to manually end the parking release state of the transmission.

In this case, the groove 310 may have a second rotation wall 330 for preventing the bullet 400 positioned at the parking release position PR from moving to return to the second unit area 312 when the second frame 300 rotates in the second direction a2, and with the above configuration, the bullet 400 may stably move relatively along the third unit area 313.

As shown in FIG. 6, as the user's external force is eliminated in a state in which the bullet 400 relatively moves to the second temporary fixing position PF2, the second frame 300 may rotate in the first direction a1 by an external force sequentially transmitted through the first cable 100 and the first frame 200, and the groove 310 may have a fourth unit area 314 so that the bullet 400 disposed at the second temporary fixing position PF2 relatively moves to the initial position when the second frame 300 rotates in the first direction a1.

That is, since the second frame 300 may no longer rotate in the second direction a2 when the bullet 400 is disposed at the second temporary fixing position PF2, the user no longer applies an external force after recognizing this state, and when the user's external force is eliminated, the second frame 300 may rotate in the first direction a1 by an external force sequentially transmitted through the first cable 100 and the first frame 200, and at this time, the bullet 400 may move (path (4)) to the initial position along the fourth unit area 314, thereby stably ending the parking release state of the transmission.

In this case, the fourth unit area 314 may include a 4-1 unit area 314a extending in the circumferential direction a of the second frame 300, and a 4-2 unit area 314b connecting a rear end of the 4-1 unit area 314a to the first unit area 311, and with the above configuration, the bullet 400 may stably move from the second temporary fixing position PF2 to the initial position.

As shown in FIG. 6, the bullet 400 may be disposed to move in the radial direction r as much as a difference between a radial distance from the center of the second frame 300 to the first temporary fixing position PF1 and a radial distance from the center of the second frame 300 to the second temporary fixing position PF2, and with the above configuration, the direct movement of the bullet 400 can be minimized, and the bullet 400 can smoothly relatively move along each unit area.

As shown in FIG. 2, the manual parking state release device may further include a cover 500 having a support surface 510 that prevents the bullet 400 from moving in the circumferential direction a when the second frame 300 rotates, and, with the above configuration, the bullet 400 may stably move only in the radial direction r.

As shown in FIG. 3, a first gear surface 210 may be provided along the circumference of the first frame 200, and a second gear surface 340 engaged with the first gear surface 210 may be provided at the center of the second frame 300. That is, a manipulation load can be reduced through a gear ratio (a lever ratio may be 6 or higher) of the first gear surface 210 and the second gear surface 340, the parking release state of the transmission can be stably maintained in an emergency by a pull-pull type manual manipulation through the rotational movement of the first frame 200 and the second frame 300, and the parking release state of the transmission may also be stably ended when the emergency situation ends.

In this case, a distance from the center of the first frame 200 to the first gear surface 210 may be formed to be greater than a distance from the center of the second frame 300 to the second gear surface 340, thereby effectively reducing the manipulation load.

As shown in FIG. 2, the first frame 200 may have a first cable fixing groove 220 to which an end portion of the first cable 100 is fixed, and the second frame 300 may have a second cable fixing groove 350 to which an end portion of the second cable through which a user applies an external force is fixed, and with the above configuration, the first cable 100 and the second cable 600 may be stably fixed, and when the user applies an external force, such an external force may be stably transmitted to the first cable 100 through the second frame 300 and the first frame 200, thereby smoothly releasing the parking state of the transmission.

As described above, since the manual parking state release device according to one embodiment of the present invention may pull the first cable 100 for releasing the parking state of the transmission through the second frame 300 for rotating the first frame 200 in the first direction a1 while rotating in the second direction a2 when the user's external force is applied, the parking state may be manually released, and when the parking state is released, it is possible to prevent the second frame 300 from unintentionally rotating in the first direction a1 using the bullet 400, thereby stably maintaining the parking release state of the transmission.

With the above configuration, since a manual parking state release device according to one aspect of the present invention can pull a first cable for releasing a parking state of a transmission through a second frame that rotates a first frame in a first direction while rotating in a second direction when a user's external force is applied, it is possible to manually release the parking state and prevent the second frame from unintentionally rotating in the first direction using a bullet when the parking state is released, thereby stably maintaining the parking release state of the transmission.

It should be understood that the effects of the present invention are not limited to the above-described effects and include all effects inferable from the configuration of the invention described in the detailed description or claims of the present invention.

Although embodiments of the present invention have been described, the spirit of the present invention is not limited to the embodiments presented in the present specification, and those skilled in the art who understand the spirit of the present invention can easily propose other embodiments by the modification, change, deletion, addition, or the like of components within the scope of the same spirit, but this will also be included in the scope of the spirit of the present invention.

What is claimed is:

1. A manual parking state release device comprising:
    a first cable configured to release a parking state of a transmission;
    a first frame configured to apply an external force of a user to the first cable while rotating in a first direction so that the parking state of the transmission is released;
    a second frame configured to rotate the first frame in the first direction while rotating in a second direction when the external force of the user is applied to a second cable; and
    a bullet configured to prevent the second frame from unintentionally rotating in the first direction so that a parking release state of the transmission is maintained;
    wherein the first frame has a first cable fixing groove to which an end portion of the first cable is fixed, and
    the second frame has a second cable fixing groove to which an end portion of the second cable through which the user applies the external force is fixed.

2. The manual parking state release device of claim 1, wherein the second frame has a groove providing a movement path of the bullet, and
    the groove has a parking release position to be fixedly caught by the bullet to prevent the second frame from unintentionally rotating in the first direction.

3. The manual parking state release device of claim 2, wherein the groove has a first unit area extending in a circumferential direction of the second frame,
    the bullet relatively moves from a front end to a rear end of the first unit area in a process in which the second frame rotates in the second direction, and
    the rear end of the first unit area is provided with a first temporary fixing position to be fixedly caught by the bullet to prevent the second frame from rotating in the second direction.

4. The manual parking state release device of claim 3, wherein, as the external force of the user is eliminated in a state in which the bullet relatively moves to the first temporary fixing position, the second frame rotates in the first direction by an external force sequentially transmitted through the first cable and the first frame, and
    the groove has a second unit area formed so that the bullet disposed at the first temporary fixing position relatively moves to the parking release position when the second frame rotates in the first direction.

5. The manual parking state release device of claim 4, wherein the groove has a first rotation wall that prevents the bullet disposed at the first temporary fixing position from moving to return to the first unit area when the second frame rotates in the first direction.

6. The manual parking state release device of claim 4, wherein, as the external force of the user is applied in a state in which the bullet relatively moves to the parking release position, the second frame rotates in the second direction,
    the groove has a third unit area formed so that the bullet disposed at the parking release position relatively moves while leaving the parking release position when the second frame rotates in the second direction, and
    a rear end of the third unit area is provided with a second temporary fixing position to be fixedly caught by the bullet to prevent the second frame from rotating in the second direction.

7. The manual parking state release device of claim 6, wherein the groove has a second rotation wall that prevents the bullet disposed at the parking release position from moving to return to the second unit area when the second frame rotates in the second direction.

8. The manual parking state release device of claim 6, wherein, as the external force of the user is eliminated in a state in which the bullet relatively moves to the second temporary fixing position, the second frame rotates in the first direction by an external force sequentially transmitted through the first cable and the first frame, and
    the groove has a fourth unit area formed so that the bullet disposed at the second temporary fixing position relatively moves to an initial position when the second frame rotates in the first direction.

9. The manual parking state release device of claim 8, wherein the fourth unit area includes a 4-1 unit area extending in the circumferential direction of the second frame, and a 4-2 unit area connecting a rear end of the 4-1 unit area to the first unit area.

10. The manual parking state release device of claim 6, wherein the bullet is disposed to move in a radial direction as much as a difference between a radial distance from a center of the second frame to the first temporary fixing position and a radial distance from the center of the second frame to the second temporary fixing position.

11. The manual parking state release device of claim 1, further comprising a cover having a support surface that prevents the bullet from moving in a circumferential direction when the second frame rotates.

12. The manual parking state release device of claim 1, wherein a first gear surface is formed along a circumference of the first frame, and
    a second gear surface engaged with the first gear surface is provided at a center of the second frame.

13. The manual parking state release device of claim 12, wherein a distance from a center of the first frame to the first gear surface is formed to be greater than a distance from the center of the second frame to the second gear surface.

* * * * *